United States Patent
Yost

(10) Patent No.: US 8,931,085 B2
(45) Date of Patent: Jan. 6, 2015

(54) DOWNLOAD OPTIMIZATION IN THE PRESENCE OF MULTICAST DATA

(75) Inventor: William Henry Yost, Indianapolis, IN (US)

(73) Assignee: Thomson Licensing, Boulogne-Billacourt (FR)

(*) Notice: Subject to any disclaimer, the term of this patent is extended or adjusted under 35 U.S.C. 154(b) by 994 days.

(21) Appl. No.: 10/524,285

(22) PCT Filed: Aug. 8, 2003

(86) PCT No.: PCT/US03/24980
§ 371 (c)(1),
(2), (4) Date: Feb. 10, 2005

(87) PCT Pub. No.: WO2004/017559
PCT Pub. Date: Feb. 26, 2004

(65) Prior Publication Data
US 2005/0216601 A1    Sep. 29, 2005

(51) Int. Cl.
*G06F 12/14* (2006.01)
*G06F 17/00* (2006.01)
*H04L 29/06* (2006.01)
*H04L 9/32* (2006.01)
*H04L 12/18* (2006.01)
*H04L 12/801* (2013.01)
*G06F 21/56* (2013.01)

(52) U.S. Cl.
CPC ............ *H04L 12/185* (2013.01); *G06F 21/566* (2013.01); *H04L 29/06* (2013.01); *H04L 63/08* (2013.01); *H04L 63/1416* (2013.01); *H04L 63/0281* (2013.01); *H04L 63/065* (2013.01); *H04L 63/1408* (2013.01); *H04L 63/145* (2013.01); *H04L 47/10* (2013.01); *H04L 47/19* (2013.01)

USPC ................ 726/22; 726/12; 726/14; 713/153; 713/163; 713/168; 713/188

(58) Field of Classification Search
CPC ....... H04L 29/06; H04L 63/065; H04L 63/08; H04L 63/145; H04L 63/0281; H04L 63/1416; H04L 63/1408; G06F 21/566
USPC .......... 713/153, 163, 168, 188; 726/12, 14, 22
See application file for complete search history.

(56) References Cited

U.S. PATENT DOCUMENTS

| 6,097,720 A | 8/2000 | Araujo et al. |
| 6,118,785 A | 9/2000 | Araujo et al. |

(Continued)

FOREIGN PATENT DOCUMENTS

| EP | 1 119 134 | 7/2001 |
| EP | 1119134 | 7/2001 |

(Continued)

OTHER PUBLICATIONS

Liao et al, Receiver-initiated Group Membership Protocol (RGMP): a New Group Management Protocol for IP Multicasting, 1999, IEEE, pp. 51-58.*

(Continued)

*Primary Examiner* — Aravind Moorthy
(74) *Attorney, Agent, or Firm* — Robert D. Shedd

(57) ABSTRACT

There is provided a method for optimizing a download of requested data to an electronic data processing unit that is currently receiving unrequested multicast data through a router included in a network. The unrequested multicast data corresponds to at least one multicast data group. Internet Group Management Protocol (IGMP) V2 Leave Messages are sent to the router for the at least one multicast data group. IGMP Membership Queries issued by the router for the at least one multicast data group are ignored, so as to cause the router to terminate a transmission of the unrequested multicast data to free up available bandwidth for the download of the requested data.

15 Claims, 2 Drawing Sheets

(56) References Cited

U.S. PATENT DOCUMENTS

| | | | |
|---|---|---|---|
| 6,370,142 B1* | 4/2002 | Pitcher et al. | 370/390 |
| 6,424,657 B1 | 7/2002 | Voit et al. | |
| 6,457,059 B1 | 9/2002 | Kobayashi | |
| 6,633,765 B1 | 10/2003 | Maggenti | |
| 6,826,612 B1* | 11/2004 | Bosloy et al. | 709/227 |
| 2002/0150094 A1* | 10/2002 | Cheng et al. | 370/389 |
| 2003/0012180 A1* | 1/2003 | Donahue et al. | 370/352 |

FOREIGN PATENT DOCUMENTS

| | | |
|---|---|---|
| JP | 2000-4251 | 1/2000 |
| JP | 2001-209606 | 8/2001 |

OTHER PUBLICATIONS

Hardjono et al, Key Establishment for IGMP Authentication in IP Multicast, 2000, IEEE, pp. 247-252.*

Hardjono et al, Key Establishment for IGMP Authentication in IP Multicast, IEEE 2000, pp. 247-252.

Vince Vittore, Microsoft woos telco realm with IP approach to video Telephony, Oct. 2003, p. 20.

Search Report Dated Nov. 12, 2003.

Fenner, W.; "Internet Group Management Protocol, Version 2", Xerox PARC, Network Working Group, Nov. 1997, pp. 1-25.

Bradner, "Key Words for Use in RFCs to Indicate Requirement Levels", Network Working Group, Mar. 1997.

* cited by examiner

US 8,931,085 B2

DOWNLOAD OPTIMIZATION IN THE PRESENCE OF MULTICAST DATA

This application claims the benefit, under 35 U.S.C. §365 of International Application PCT/US03/24980, filed Aug. 8, 2003, which was published in accordance with PCT Article 21(2) on Feb. 26, 2004 in English and which claims the benefit of U.S. provisional patent application No. 60/404,241, filed Aug. 16, 2002.

FIELD OF THE INVENTION

The present invention generally relates to networks and, more particularly, to optimizing the download speed of requested data to an electronic data processing unit when unrequested multicast data is currently be received by the electronic data processing unit.

BACKGROUND OF THE INVENTION

When an electronic data processing unit requests Internet Protocol (IP) data, either unicast data directed to the unit, or multicast data, there may also be transmitted to it multicast data which it has not requested. One way this can happen is if the unit was previously joined to one or more multicast groups and then was halted and rebooted. After rebooting, the multicast data continues to be received by the unit even though it does not currently request it. Due to the limited bandwidth of the network line and the continued transmission of the IP multicast stream, the downloading of the requested data is undesirably slowed.

One conventional solution to this problem is to save the group identifiers of the joined multicast streams in non-volatile storage. Then, when the electronic data processing unit reboots, an Internet Group Management Protocol (IGMP) V2 Leave Group Message can be sent that references the saved group identifiers of the joined multicast streams to cause the transmission of the multicast streams to be stopped. Since most non-volatile storage elements have a limit on the number of times to which they can be written, the preceding conventional solution can disadvantageously lead to the destruction of a non-volatile storage element.

This solution is even more undesirable in an electronic data processing unit that acts as a home gateway for other electronic data processing units in the home. In this case, the first unit will need to be informed by the other units which IP multicast streams they want to receive. The first unit (the "gateway" box) will ask for these IP multicast streams from the multicast router and forward them to the other units. Thus, these multicast streams for the other units in the home will also be present on the line and a record of them also needs to be kept so they can also be stopped. This requires some modification of an existing library of code in order to obtain this information and makes the preceding conventional solution even more difficult.

Accordingly, it would be desirable and highly advantageous to have an improved method and system for optimizing the download speed of requested data to an electronic data processing unit when unrequested multicast data is currently be received by the unit.

SUMMARY OF THE INVENTION

The problems stated above, as well as other related problems of the prior art, are solved by the present invention, which is directed to a method and system for optimizing the download speed of requested data to an electronic data processing unit when unrequested multicast data is currently be received by the unit. The method and system of the present invention cause the termination of the unrequested multicast data transmission, so that the requested data (e.g., configuration data and program guide data) can be downloaded more quickly utilizing bandwidth previously occupied by the unrequested multicast data.

According to an aspect of the present invention, there is provided a method for optimizing a download of requested data to an electronic data processing unit that is currently receiving unrequested multicast data through a router included in a network. The unrequested multicast data corresponds to at least one multicast data group. Internet Group Management Protocol (IGMP) V2 Leave Messages are sent to the router for the at least one multicast data group. IGMP Membership Queries issued by the router for the at least one multicast data group are ignored, so as to cause the router to terminate a transmission of the unrequested multicast data to free up available bandwidth for the download of the requested data.

According to another aspect of the present invention, in a network having a router, there is provided a system for optimizing a download of requested data occurring concurrently with a receipt of unrequested multicast data from the router. The unrequested multicast data corresponds to at least one multicast data group. The system includes an electronic data processing unit for sending Internet Group Management Protocol (IGMP) V2 Leave Group Messages for the at least one multicast data group to the router, and for ignoring IGMP Membership Queries for the at least one multicast data group issued by the router so as to cause the router to terminate a transmission of the unrequested multicast data to free up available bandwidth for the download of the requested data.

These and other aspects, features and advantages of the present invention will become apparent from the following detailed description of preferred embodiments, which is to be read in connection with the accompanying drawings.

DETAILED DESCRIPTION OF THE INVENTION

Figure 1:
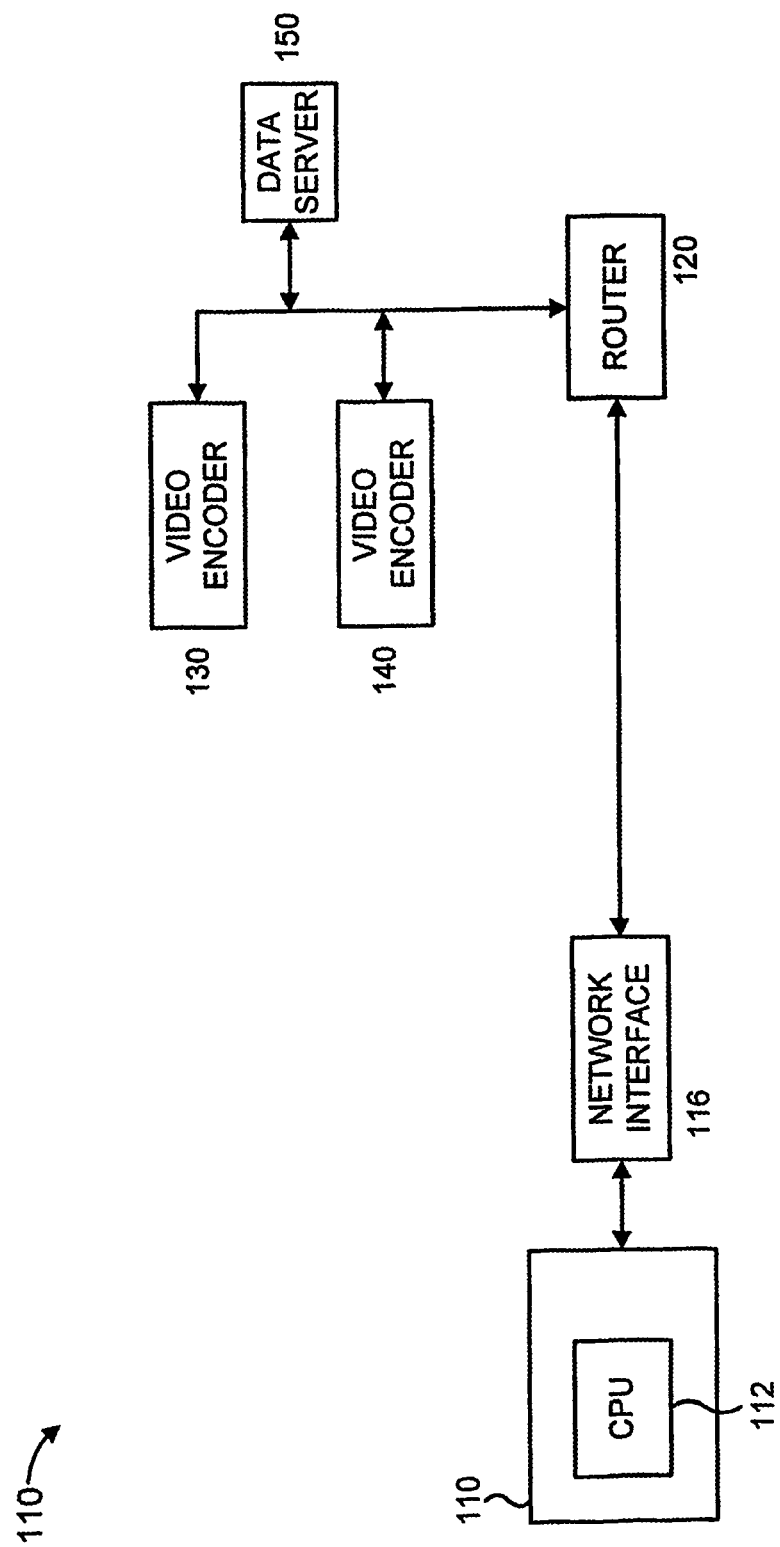
FIG. 1 is a block diagram illustrating a network 100 to which the present invention may be applied, according to an illustrative embodiment of the present invention.

The present invention is directed to a method and system for optimizing the download speed of requested data to an electronic data processing unit when unrequested multicast data is currently being received by the unit. The present invention is particularly suited, but not limited, to situations where the electronic data processing unit is a set top box that is being rebooted and requested data, such as, but not limited to, configuration data and program guide data is to be downloaded to the set top box. The present invention is intended for use in situations wherein the multicast data is "sensed" by a gateway electronic data processing unit (or a sole electronic data processing unit in the case of only one unit) and forwarded to either a local consumer device (e.g., television) or to other electronic data processing units, if any. That is, the present invention is not intended for use where the group identifiers of the multicast data is being stored in non-volatile memory as in the prior art, since such storage requires all other units to inform the gateway unit which multicast groups they have respectively joined (increased overhead) as well as runs the risk of exceeding the maximum number of writes to the memory which could cause the memory to burn out.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

For illustrative purposes, a general description will now be given of a method for optimizing a network download of requested data in the presence of unrequested multicast data, according to an illustrative embodiment of the present invention. It is to be appreciated that the present invention is not limited to networks implementing ADSL and, thus, any type of network that employs IP and IGMP may be utilized, while maintaining the spirit and scope of the present invention.

The method is preferably, although not necessarily, practiced with respect to an environment (home or otherwise) having more than electronic data processing unit, wherein one of the units functions as a gateway unit for the other units. The following description is directed to this gateway electronic data processing unit and, thus, any references to an electronic data processing unit with respect to the following method are directed to the gateway unit. It is to be appreciated that the method may also be practiced in the case of an environment (home or otherwise) having only one electronic data processing unit.

The present invention utilizes the Internet Group Management Protocol (IGMP). As is known, IGMP is used to, among other things, register clients that want to receive messages for a particular multicast group and to allow clients to leave a particular multicast group. IGMP is used to report group memberships to any neighboring routers that are multicast enabled. An IGMP V2 Membership Query is used by a router to determine whether any group members exist for a particular multicast group. An IGMP Membership Report is used by a particular network node (e.g., a gateway set top box) to inform the router that the particular network node is listening for multicast messages. The IGMP Membership Report may be sent in response to the IGMP Membership Query. An IGMP V2 Leave Group Message is used by a member of a particular multicast group to leave that group (i.e., to terminate the transmission of data for that multicast group to that member).

When the electronic data processing unit reboots, the unit will first listen to all multicast data being sent to it on the network line. The unit will record in a list the multicast group number for each multicast data that is received over a short period of time (e.g., one second to a few seconds). Then, for each of these multicast group numbers in the list, the electronic data processing unit will transmit an Internet Group Management Protocol (IGMP) V2 Leave Group Message on the network line that announces that the unit no longer wishes to receive messages belonging to that multicast group. This should cause the multicast router present on the network attached to the electronic data processing unit to send within a short period of time (e.g., a few seconds), an IGMP Membership Query to the electronic data processing unit for each of these multicast groups. Each of the IGMP Membership Queries will be specific to a particular multicast data group. The IGMP Membership Queries ask the electronic data processing unit if the unit wants to continue to receive data for these multicast groups. In this method, the electronic data processing unit will not reply to these IGMP Membership Queries with an IGMP Membership Report. When a few more seconds have elapsed without the multicast router receiving an IGMP Membership Report from the set top box, the multicast router will terminate the sending of this multicast data to the electronic data processing unit. This will allow the full bandwidth capability of the network line to be used to transmit the program download data to the electronic data processing unit and the unit will be ready for use in a short period of time.

FIG. 1 is a block diagram illustrating a network 100 to which the present invention may be applied, according to an illustrative embodiment of the present invention. The system 100 includes an electronic data processing unit which is set top box 110 having a CPU 112 and included therein. The system further includes a network interface 116 that is connected to the set top box 110 on one end and to a router 120 on the other end. The router 120 is coupled to a video encoder 130, another video encoder 140, and a data server 150.

It is to be appreciated that while only one electronic data processing unit is shown in the system 100 of FIG. 1, the present invention may be readily utilized in a configuration such that multiple electronic data processing units are present, with set top box 110 functioning as the gateway for the other multiple electronic data processing units which could be set top boxes.

As noted above, the present invention is directed to optimizing the downloading of "requested data" while "unrequested multicast data" is concurrently being received. In the examples described herein, the unrequested multicast data is provided by the video encoders (130, 140), and the requested data (configuration data, program data, etc.) is provided by the data server 150. Of course, other arrangements are possible, as readily contemplated by one of ordinary skill in the related art. It is to be appreciated that the "requested data" may be unicast data, and even multicast data, and so forth. However, the significant difference between the "requested data" (to be received/downloaded) and the "unrequested multicast data" currently being received is that it is desirable to receive the requested data as quick as possible, even at the expense of terminating the receipt of the unrequested multicast data to hasten the downloading of the requested data.

The network interface 116 includes circuitry for interfacing the CPU 112 of the set top box 110 to the router 120. One possible implementation of the network interface 116 would be an Ethernet interface. Another implementation of the network interface 116 would include an Ethernet interface connected to an Asymmetric Digital Subscriber Line (ADSL) modem that, in turn, is connected to a Digital Subscriber Line Access Multiplexer (DSLAM). Given the teachings of the present invention provided herein, one of ordinary skill in the related art will contemplate these and various other configurations of the elements of a system to which the present invention may be applied, while still maintaining the spirit and scope of the present invention.

Figure 2:
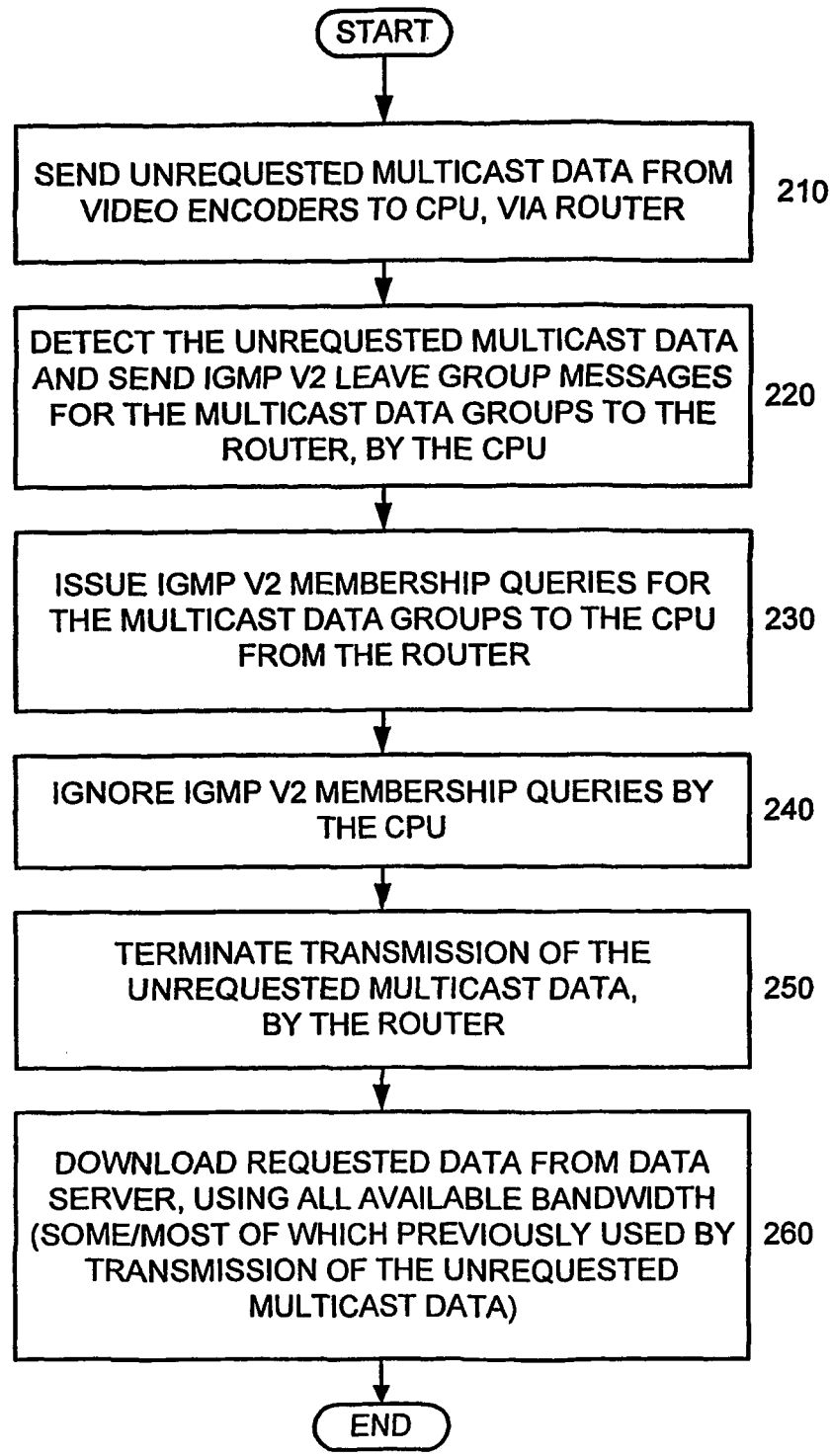
FIG. 2 is a flow diagram illustrating a method for optimizing the downloading of requested data when unrequested multicast data is currently being received, according to an illustrative embodiment of the present invention.

FIG. 2 is a flow diagram illustrating a method for optimizing the downloading of requested data when unrequested multicast data is currently being received, according to an illustrative embodiment of the present invention. For the sake of illustration, the method of FIG. 2 is described with respect to the system 100 of FIG. 1. However, as noted above, the present invention is not limited to solely systems configured as shown in FIG. 1 and, thus, other system configurations may also be utilized by the present invention, while maintaining the spirit and scope of the present invention.

Unrequested Multicast data corresponding to multicast data groups is sent to the CPU 112 from the video encoders 130, 140 (step 210). For example, data corresponding to a first multicast data group may be sent to the CPU 112 from the video encoder 130, and other data corresponding to a second multicast group may be sent to the CPU 112 from the other video encoder 140. This data will pass through and be processed by the router 120 and the network interface 116.

The unrequested multicast data is detected by the CPU 112, and Internet Group Management Protocol (IGMP) V2 Leave Group Messages are then sent to the router 120 from the CPU 112 for the multicast data groups (step 220). It is to be appreciated that step 220, by detecting the unrequested multicast data, is actually sensing the receipt of such data so as to, possibly among other things, identify the group numbers to which the unrequested multicast data belong.

IGMP V2 Membership Queries are issued to the CPU 112 from the router 120 for the multicast data groups (step 230). The CPU 112 does not respond to the IGMP V2 Membership Queries (the CPU 112 ignores the Membership Queries or, at the least, does not respond with IGMP V2 Membership Reports (step 240) and, thus, the sending of the multicast data by the router 120 is terminated (see step 250).

The requested data (e.g., configuration data, program guide data, and so forth) is then downloaded by the CPU 112 from the data server 150 via the router 120, advantageously utilizing all of the bandwidth that is available (some or most of which was previously occupied by the unrequested multicast data transmissions) (step 260). Upon cessation of the downloading of the requested data, receipt of newly requested multicast data may be resumed, as is known by one of ordinary skill in the related art. For example, the CPU 112 may send IGMP Membership Reports to the router after any and all other program guide data has been completely downloaded utilizing the full available bandwidth.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for downloading data to an electronic data processing unit (EDPU) that is currently receiving multicast data through a router included in a network, the multicast data corresponding to at least one multicast data group, the method comprising:
   determining that a download is to be received for use by the EDPU;
   sensing a receipt of multicast data so as to identify group numbers of the multicast data;
   recording in a list the multicast group number for each multicast data that is received;
   for each multicast group number in the list, sending an Internet Group Management Protocol (IGMP) Leave Group Messages on the network line; and
   ignoring IGMP Membership Queries issued by the router so as to cause the router to terminate a transmission of the multicast data to increase bandwidth for the download of the data.

2. The method of claim 1, wherein the downloaded data comprises at least one of configuration data and program guide data.

3. The method of claim 1, wherein said ignoring comprises preventing a transmission of an IGMP Membership Report to the router in response to the IGMP Membership Queries.

4. The method of claim 1, further comprising downloading the data while the transmission of the multicast data has been terminated.

5. In an network having a router, a system for downloading data occurring concurrently with a receipt of multicast data from the router, the multicast data corresponding to at least one multicast data group, the system comprising:
   an electronic data processing unit (EDPU) that determines a download is to be received for use by the EDPU, senses a receipt of multicast data so as to identify group numbers of the multicast data, records in a list the multicast data group number for each multicast data that is received; for each of these multicast group numbers in the list sending an Internet Group Management Protocol (IGMP) Leave Group Messages on the network line, and for ignoring IGMP Membership Queries issued by the router so as to cause the router to terminate a transmission of the multicast data to increase bandwidth for the download.

6. The system of claim 5, wherein the downloaded data comprises at least one of configuration data and program guide data.

7. The system of claim 5, wherein said electronic data processing unit (EDPU) ignores the IGMP Membership Queries by preventing a transmission of an IGMP Membership Report to the router in response to the IGMP Membership Queries.

8. The system of claim 5, wherein said electronic data processing unit (EDPU) further downloads the data while the transmission of the multicast data group has been terminated.

9. The system of claim 5, further comprising a modem connected in between the electronic data processing unit (EDPU) and the router for exchanging information there between.

10. The system of claim 9, wherein the modem is adapted for use with Asymmetrical Digital Subscriber Line (ADSL).

11. A non-transitory program storage device readable by a machine, tangibly embodying a program of instructions executable by the machine to perform method steps for downloading of data to an electronic data processing unit (EDPU) that is currently receiving multicast data through a router included in a network, the multicast data corresponding to at least one multicast data group, the method comprising:
   determining that a download is to be received for use by the EDPU;

sensing a receipt of multicast data so as to identify group numbers of the multicast data;

recording in a list the multicast group number for each multicast data that is received;

for each multicast group number in the list, sending an Internet Group Management Protocol (IGMP) Leave Group Messages on the network line; and ignoring IGMP Membership Queries issued by the router so as to cause the router to terminate a transmission of the multicast data to increase bandwidth for the download of the data.

12. The non-transitory program storage device of claim 11, wherein the data comprises at least one of configuration data and program guide data.

13. The non-transitory program storage device of claim 11, wherein said ignoring comprises preventing a transmission of an IGMP Membership Report to the router in response to the IGMP Membership Queries.

14. The non-transitory program storage device of claim 11, further comprising downloading the data while the transmission of the multicast data has been terminated.

15. The non-transitory program storage device of claim 11, further comprising sensing a receipt of any multicast data so as to identify group numbers of the multicast data.

* * * * *